US009427900B2

(12) United States Patent
Desbois et al.

(10) Patent No.: US 9,427,900 B2
(45) Date of Patent: Aug. 30, 2016

(54) COMPOSITE COMPONENT COMPRISING A POLYMER PHASE AND A FOAMED PHASE, AND PROCESSES FOR PRODUCING THE SAME

(75) Inventors: Philippe Desbois, Edingen-Neckarhausen (DE); Olaf Kriha, Frankenthal (DE); Bangaru Sampath, Ludwigshafen (DE); Holger Ruckdäschel, St Martin (DE); Dietrich Scherzer, Neustadt (DE); Freddy Gruber, Offenbach (DE); Klaus Hahn, Kirchheim (DE)

(73) Assignee: BASF SE, Ludwigshafen (DE)

( * ) Notice: Subject to any disclaimer, the term of this patent is extended or adjusted under 35 U.S.C. 154(b) by 203 days.

(21) Appl. No.: 13/292,403

(22) Filed: Nov. 9, 2011

(65) Prior Publication Data
US 2012/0119402 A1    May 17, 2012

Related U.S. Application Data

(60) Provisional application No. 61/412,806, filed on Nov. 12, 2010.

(51) Int. Cl.
*B29C 45/00* (2006.01)
*B29C 44/04* (2006.01)
*C08L 77/02* (2006.01)
*C08J 9/36* (2006.01)
*C08J 9/40* (2006.01)

(52) U.S. Cl.
CPC ............ *B29C 44/0461* (2013.01); *C08J 9/365* (2013.01); *C08J 9/405* (2013.01); *C08L 77/02* (2013.01); *C08J 2205/052* (2013.01); *C08J 2377/00* (2013.01); *C08J 2477/02* (2013.01)

(58) Field of Classification Search
CPC ........... B32B 5/18; B32B 27/40; B32B 5/20; B32B 2266/0278; B29C 44/0461; C08J 9/365; C08J 9/405; C08J 2477/02; C08J 2205/052; C08J 2377/00; C08L 77/02
USPC ............................. 264/45.1, 319, 328.1, 46.4
See application file for complete search history.

(56) References Cited

U.S. PATENT DOCUMENTS

| | | | | |
|---|---|---|---|---|
| 3,767,742 A * | 10/1973 | Robin | ........................... | 264/45.2 |
| 3,826,785 A * | 7/1974 | Phillip et al. | ................. | 528/315 |
| 3,874,981 A * | 4/1975 | Hayashi et al. | ................ | 428/90 |
| 4,507,255 A * | 3/1985 | Shizawa | ....................... | 264/45.1 |
| 4,576,860 A * | 3/1986 | Fink et al. | .................. | 428/314.4 |
| 4,995,545 A * | 2/1991 | Wycech | ......................... | 228/119 |
| 5,256,465 A * | 10/1993 | Martin et al. | ................. | 428/158 |
| 5,558,731 A * | 9/1996 | Labrie et al. | ................... | 156/78 |
| 5,837,172 A * | 11/1998 | Pritchard et al. | ........... | 264/46.4 |
| 7,452,291 B2 * | 11/2008 | Sullivan et al. | ............. | 473/377 |
| 7,740,943 B2 * | 6/2010 | Mutsuda et al. | ........... | 428/423.1 |
| 7,807,260 B2 * | 10/2010 | Nadella et al. | ............ | 428/316.6 |
| 8,328,972 B2 * | 12/2012 | Bracke | ............................ | 156/79 |
| 2001/0047075 A1 * | 11/2001 | Kloosterman et al. | ....... | 528/323 |
| 2002/0112428 A1 * | 8/2002 | Dingler | ...................... | 52/309.16 |
| 2003/0225197 A1 * | 12/2003 | Rajagopalan et al. | ........ | 524/308 |
| 2004/0197545 A1 * | 10/2004 | Gehlsen et al. | ........... | 428/304.4 |
| 2005/0272907 A1 * | 12/2005 | Jin et al. | ...................... | 528/310 |
| 2006/0167124 A1 * | 7/2006 | Bernard | ............... | C08G 18/281 |
| | | | | 521/163 |
| 2006/0281873 A1 * | 12/2006 | Alting et al. | ................. | 525/432 |
| 2007/0108663 A1 * | 5/2007 | Yusa et al. | ................. | 264/328.1 |
| 2008/0274346 A1 * | 11/2008 | Miller et al. | .............. | 428/315.7 |
| 2008/0285292 A1 * | 11/2008 | Medina | ......................... | 362/473 |
| 2009/0306332 A1 * | 12/2009 | Kray | ...................... | C08G 69/20 |
| | | | | 528/323 |
| 2010/0035731 A1 * | 2/2010 | Rohr et al. | ....................... | 482/54 |
| 2010/0062238 A1 * | 3/2010 | Doyle et al. | ............. | 428/295.1 |
| 2011/0027575 A1 * | 2/2011 | Drube et al. | .............. | 428/319.7 |
| 2011/0318524 A1 * | 12/2011 | Jakobi | ................... | B29C 44/086 |
| | | | | 428/71 |
| 2012/0273984 A1 * | 11/2012 | Desbois et al. | .............. | 264/45.4 |
| 2012/0329956 A1 * | 12/2012 | Prenzel et al. | ................ | 525/370 |
| 2013/0102701 A1 * | 4/2013 | Durr | ...................... | C08G 69/16 |
| | | | | 523/218 |
| 2013/0123402 A1 * | 5/2013 | Freitag et al. | ................ | 524/121 |
| 2014/0329971 A1 * | 11/2014 | Prenzel | ......................... | 525/297 |

FOREIGN PATENT DOCUMENTS

| | | |
|---|---|---|
| JP | 59-169833 | 9/1984 |
| JP | 63-69614 | 3/1988 |
| JP | 7-195602 | 8/1995 |
| JP | 2826059 B2 | 11/1998 |
| WO | WO2005109994 * | 11/2005 ............ B23B 27/34 |

OTHER PUBLICATIONS http://en.wikipedia.org/wiki/List_of_polyurethane_applications.*
U.S. Appl. No. 13/454,320, filed Apr. 24, 2012, Desbois, et al.

* cited by examiner

*Primary Examiner* — Nahida Sultana
(74) *Attorney, Agent, or Firm* — Oblon, McClelland, Maier & Neustadt, L.L.P

(57) ABSTRACT

The present invention relates to a composite component comprising an unfoamed polymer phase and a foamed phase, and to a process for producing the same.

3 Claims, No Drawings

COMPOSITE COMPONENT COMPRISING A POLYMER PHASE AND A FOAMED PHASE, AND PROCESSES FOR PRODUCING THE SAME

CROSS-REFERENCE TO RELATED APPLICATIONS

This application is based upon and claims the benefit of priority to U.S. Provisional Application No. 61/412,806 filed on Nov. 12, 2010.

BACKGROUND OF THE INVENTION

The present invention relates to composite components comprising an unfoamed polymer phase and a foamed phase, and to a process for producing the same.

Composite components composed of at least two different components are known in the prior art. For the purposes of the present disclosure, the expression "composite component" relates to a component made of two or more connected materials. Examples of conventional composite materials are carbon-fiber-reinforced plastic and glassfiber-reinforced plastic.

For the purposes of the present invention, foam is composed of small gas bubbles separated by solid walls or by flexible walls.

Examples of foams are inter alia:
pumice, a porous glassy volcanic rock with density lower than that of water
foams, foam rubber, and polystyrene as material for insulation and for packing
foamed glass
aerogels
metal foams, e.g. aluminum foam for metal structures which have high strength but low weight
foamed concrete.

When a polyamide is combined with a foam the result is a sandwich foam in the context of fiber-composite materials.

JP 59169833 A describes a process for producing a composite product where a high-viscosity plastics composition is cast into a mold.

M. T. Penny, Cellular Polymers (1988), 7 (2), pp. 119-133 describes the production of nylon foams via "reactive injection molding" (RIM).

JP 63069614 A describes the production of synthetic resin from a plurality of layers, where the inner layer is composed of polyurethane (PU) and the outer layer is based on caprolactam.

JP 7195602 A and JP 2826059 B2 describe moldings composed of a foamed core based on PU and an external layer comprising nylon and carbon fibers, where the core and the external layer are connected to one another by heating.

However, the composite materials of the prior art, and the processes for producing the same, have certain disadvantages. By way of example, the materials known hitherto mostly have relatively high weight. Furthermore, the materials of the prior art are mostly adhesive-bonded; the result is often inadequate adhesion between various components. In many instances moreover there is a risk with the processes previously described that the foam component will be damaged or destroyed during the course of processing, because high pressure is needed.

It was therefore an object to achieve a further reduction in the weight of a composite component in order to provide genuinely lightweight materials, while nevertheless ensuring good adhesion between various components and moreover maintaining as far as possible the stiffness of the product. The foam which is a constituent of a composite component here should not be damaged during production of the composite component.

Surprisingly, said object has now been achieved by production of an unfoamed polymer phase via anionic polymerization in the presence of a foamed phase.

The present invention therefore provides a process for producing a composite component, comprising at least one unfoamed polymer phase (P) comprising polyamide, and at least one foamed phase (G), where the unfoamed phase is produced via anionic polymerization of at least one monomer (M) selected from the group of the lactams in situ in the presence of the foamed phase (G).

The present invention further provides a composite component that can be produced by the process of the invention, and also provides the use of a composite component that can be produced by the process of the invention, as structural element in automobile construction.

In one preferred embodiment of the process of the invention, the foamed phase (G) is a closed-cell phase.

For the purposes of the present disclosure, the expression "closed-cell foam" relates to foams in which the cells do not have pores or disrupted areas. In contrast to this, the expression "open-cell" designates a foam structure defined by the presence of at least two pores or disrupted areas associated with each cell. Furthermore, the majority of the cell lamellae must belong to at least three cells. Production of closed-cell foams is generally based on polyurethane (PU), polyvinyl chloride (PVC), polymethacrylimide (PMI), and polystyrene (PS) (see Arnim Kraatz, Dissertation 2007, University of Halle).

In the invention, the unfoamed polymer phase (P) is preferably produced via anionic polymerization of at least one lactam monomer by way of reactive injection molding (RIM).

A description of the RIM process for producing polyamide moldings, and of the necessary apparatuses, is found by way of example in P. Wagner, Kunststoffe 73 (1983), 10, 588-590, and also in P. Schneider et al., Plastics Engineering, 1984, pp. 39-41.

The at least one monomer (M) in the process of the invention is one selected from the group of lactams. By way of example, it is possible to use monomers from the group consisting of caprolactam, piperidone, pyrrolidone, laurolactam, and mixtures of these. Preference is given to use of a monomer (M) selected from the group comprising caprolactam, laurolactam, and mixtures of these.

It is also possible to copolymerize up to 50% of lactones, preferably caprolactone, with the monomer (M) from the group of the lactams.

In one embodiment of the process of the invention, the anionic polymerization of the at least one monomer (M) is carried out in the presence of a catalyst (K) and/or of an activator (A).

An example of a suitable optional catalyst (K) is sodium caprolactamate, potassium caprolactamate, magnesium bromide caprolactamate, magnesium chloride caprolactamate, magnesium biscaprolactamate, sodium hydrides, sodium metal, sodium hydroxide, sodium methoxide, sodium ethoxide, sodium propoxide, sodium butoxide, sodium hydride, potassium metal, potassium hydroxide, potassium methoxide, potassium ethoxide, potassium propoxide, potassium butoxide, preferably sodium hydrides, sodium metal, sodium caprolactamate, and particularly preferably sodium caprolactamate (e.g. Brüggolen® C 10, a solution made of 18% by weight sodium caprolactamate in caprolactam).

Compounds suitable as optional activator (A) are inter alia aliphatic diisocyanates, such as butylene diisocyanate, hexamethylene diisocyanate, octamethylene diisocyanate, decamethylene diisocyanate, undodecamethylene diisocyanate, dodecamethylene diisocyanate, and also aromatic diisocyanates, such as tolylene diisocyanate, isophorone diisocyanate, 4,4'-methylenebis(phenyl isocyanate), 4,4'-methylenebis(cyclohexyl isocyanate), or polyisocyanates, such as isocyanurates of hexamethylene diisocyanate, Basonat® HI 100 from BASF SE, allophanates, such as ethyl allophanate, and mixtures of these, preferably hexamethylene diisocyanate, isophorone diisocyanate, and particularly preferably hexamethylene diisocyanate. The diisocyanates can be replaced by monoisocyanates.

Compounds alternatively suitable as activators are aliphatic diacyl halides, such as butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, and also aromatic diacyl halides such as tolylenedioyl chloride, tolylenemethylenedioyl bromide, isophoronedioyl chloride, isophoronedioyl bromide, 4,4'-methylenebis(phenyl)oyl chloride, 4,4'-methylenebis(phenyloyl bromide, 4,4'-methylenebis(cyclohexyloyl chloride, 4,4'-methylenebis(cyclohexyl)oyl bromide, or a mixture of these, preferably hexamethylenedioyl chloride, hexamethylenedioyl bromide, or a mixture of these, particularly preferably hexamethylenedioyl chloride. The diacyl halides can be replaced by monoacyl halides.

The molar ratio of lactam to the catalyst can vary widely, but is generally from 1:1 to 10 000:1, preferably from 10:1 to 1 000:1, particularly preferably from 50:1 to 300:1.

The molar ratio of activator to the catalyst can vary widely, but is generally from 100:1 to 1:10 000, preferably from 10:1 to 1:100, particularly preferably from 1:1 to 1:10.

The foamed phase (G) in the invention can by way of example take the form of a block, of a sphere, of a cylinder, or of a pyramid.

The foamed phase (G) is preferably composed of polyamide (PA). However, the foamed phase can also be composed of another material, for example of another plastic, or of metal or wood.

In one embodiment of the process of the invention, the foamed phase (G) forms a block, where at least 90%, preferably at least 95%, of the surface of a lateral area of the foamed phase (G) has been covered with the unfoamed phase (P).

In another embodiment of the process of the invention, at least 90%, preferably at least 95%, of the entire surface of the foamed phase (G) have been covered with the unfoamed phase (P).

In one embodiment of the process of the invention, the foamed phase (G) is introduced first into a mold, and then the unfoamed polymer phase (P) is cast into said mold.

The polymerization can also be carried out in the presence of crosslinking agents.

It is possible here to react a diisocyanate or a diacyl halide with a lactam A at a temperature of from (−30) to 150° C. and then to carry out reaction with a lactam B, with a catalyst, with an activator, at a temperature of from 40 to 240° C. Diisocyanate here can be replaced by polyisocyanate, and diacyl halide here can be replaced by polyacyl halide.

The polymerization can take place in the presence of additives, such as fibers or fillers; the fibers here are preferably those selected from the group comprising glass fibers and carbon fibers. Said fibers can serve as fillers and/or reinforcing materials.

Examples of other fillers or reinforcing materials that can be used are minerals of grain size conventional for thermoplastics applications, examples being kaolin, calk, wollastonite, or talc, or glass fibers, e.g. ground glass fibers, and also textile structures (wovens and laid scrims) made of unidirectional fibers, preferably glass fibers and carbon fibers.

The foamed phase (G) can also have a structure, e.g. holes, grooves, or notches.

The composite component that can be produced in the invention can also comprise more than one foamed phase (G) and more than one unfoamed polymer phase (P). By way of example, the composite component that can be produced in the invention can comprise two layers of a foamed phase (G) and three layers of an unfoamed phase (P).

The final product of the process of the invention, i.e. the composite component that can be produced in the invention, preferably has, based on the entire final product, at least 20% by volume of the foamed phase (G), particularly preferably at least 50% by volume.

The composite component that can be produced by the process of the invention can inter alia be used advantageously as structural element in automobile construction.

EXAMPLES

The examples below serve to illustrate some aspects of the present invention. They are in no way intended to restrict the scope of the present invention.

Example 1

Production of a Foam Slab with Polyamide Shell

All of the components and equipment were dry.

A closed foam made of polyamide (PA) with dimensions 55*20*95 mm$^3$ was placed in an aluminum foil shell of dimensions 65*30*105 mm$^3$. Screw threads passing through the aluminum foil into the foam were used to position the foam in such a way that the distance between foam and shell, basely and laterally, was 5 mm. The position of the upper side of the foam was 5 mm lower than that of the upper edge of the shell. The shell was placed in an oven at 150° C. under nitrogen.

The following solutions were separately produced in two glass flasks under nitrogen:
1: 69.2 g of caprolactam+8.00 g of Brüggolen® C10 (a catalyst for producing polyamide from Bruggemann; 17% of Na caprolactam in caprolactam)
2: 69.2 g of caprolactam+3.53 g of Brüggolen® C20 (an activator for producing polyamide from Bruggemann; 80% of capped diisocyanates in caprolactam),
and were mixed with the aid of a magnetic stirrer. Solutions 1 and 2 were combined at 110° C., mixed for 15 seconds, and then charged, under $N_2$, into the aluminum shell in the oven, until the shell was full. After 10 minutes, the polymerization had been completed. The aluminum shell was removed from the oven and cooled. The molding was removed from the aluminum shell. It was composed of a core made of foam and of a shell made of polycaprolactam. IV (intrinsic viscosity) of shell=215; residual caprolactam in shell: 1.2% by weight.

Example 2

Example 1 was repeated, but this time the foam was placed on a glass sphere and not secured with screw threads in order to set the separation from the aluminum shell. A weight on the foam ensured that the foam remained on the glass sphere and did not float.

Example 3

A piece of polyamide (PA) foam of dimensions 3*100*100 mm³ was positioned in a mold of dimensions 4*100*100 mm³ (injection-molding apparatus). The mold was closed, and equal amounts by volume of solution 1 added and 2 were at 120° C. after mixing in a flow mixer. The temperature of the mold was 150° C. After 10 minutes, the molded part was removed from the mold. It was composed of the foam sheathed by the polylactam.

PA shell: IV=180; residual caprolactam content in shell: 1.1% by weight

Example 4

A sheet made of expanded polypropylene (Neopolen® P, a PP foam from BASF SE with density 80 g/l) was positioned in an oven at 120° C. under nitrogen, and a mixture made of solutions 1 and 2 (mixing time 30 seconds) was poured at 100° C. onto the PP sheet. After 10 minutes, the sheet was removed from the oven. The resultant part was a laminate made of foamed polypropylene and polylactam.

IV of shell=205; residual caprolactam content in shell: 2.9% by weight

Example 5

A sheet made of Rohacell® IG foam from Evonik was positioned in an oven at 120° C. under nitrogen, and a mixture made of solutions 1 and 2 (mixing time 30 seconds) was poured at 140° C. onto the sheet. After 10 minutes, the sheet was removed from the oven. Rohacell® IG foam is a foam based on polymethacrylimide with density 75 g/l.

The resultant part was a laminate made of foamed Rohacell® and polylactam.

IV of shell=195; residual caprolactam content in shell: 1.5% by weight

Example 6

A sheet made of Lantor Soric® XF6 foam from Lantor was positioned in an oven at 100° C. under nitrogen, and a mixture made of solutions 1 and 2 (mixing time 30 seconds) was poured at 140° C. onto the sheet. Lantor Soric® XF6 foam is a foam based on nonwoven polyester of density 600 g/l.

After 10 minutes, the sheet was removed from the oven. The resultant part was a laminate made of foamed Lantor Soric® foam and polylactam.

IV of shell=223; residual caprolactam in shell: 2.2% by weight

Example 7

A sheet made of balsawood is positioned in an oven at 100° C. under nitrogen, and a mixture made of solutions 1 and 2 (mixing time 30 seconds) is poured at 110° C. onto the sheet. After 10 minutes, the sheet is removed from the oven. The resultant part is a laminate made of balsawood and polylactam.

Example 8

A sheet of aluminum foam (Alulight® Sandwich panel from Alulight Int. GmbH, 0.6 mm outer layers, 20 mm total thickness with density about 400 g/l) is positioned in an oven at 100° C. under nitrogen, and a mixture made of solutions 1 and 2 (mixing time 30 seconds) is poured at 110° C. onto the sheet. After 10 minutes, the sheet is removed from the oven. The resultant part is a laminate made of aluminum foam and polylactam.

The examples demonstrate, inter alia, that while the materials produced have relatively low density (d<0.8) they have very high stiffness, approaching straight PA. The stiffness can be determined manually by flexural tests; if the specimens are not flexible, the stiffness is high.

The invention claimed is:

1. A process for producing a composite component, the process comprising: combining a portion of at least one lactam monomer with a catalyst to form a first monomer solution, and combining another portion of the at least one lactam monomer with an activator to form a second monomer solution; and mixing the first monomer solution and the second monomer solution to form a monomer mixture; contacting the monomer mixture with at least one foamed phase; and polymerizing the at least one lactam monomer to form an unfoamed polymer phase comprising a polyamide, wherein the polymerization occurs in the presence of the at least one foamed phase; where the unfoamed phase is produced by reactive injection molding (RIM).

2. The process according to claim 1, where at least 90% of the entire surface of the foamed phase is covered with the unfoamed phase.

3. The process according to claim 1, where the foamed phase is a closed-cell phase.

* * * * *